April 22, 1958　　D. T. DOWNES ET AL　　2,831,791
METHOD AND APPARATUS FOR PROCESSING GLASS
Filed July 29, 1953　　6 Sheets-Sheet 1

FIG. 1

INVENTORS
DANIEL T. DOWNES &
EDWARD FAUSTIN
BY
Oscar L. Spencer
ATTORNEY

April 22, 1958 D. T. DOWNES ET AL 2,831,791
METHOD AND APPARATUS FOR PROCESSING GLASS
Filed July 29, 1953 6 Sheets-Sheet 2

FIG. 2

INVENTORS
DANIEL T. DOWNES and
EDWARD FAUSTIN
BY
Oscar L. Spencer
ATTORNEY

April 22, 1958

D. T. DOWNES ET AL 2,831,791

METHOD AND APPARATUS FOR PROCESSING GLASS

Filed July 29, 1953

INVENTORS
*DANIEL T. DOWNES and
EDWARD FAUSTIN*

BY

*Oscar L. Spencer*

ATTORNEY

April 22, 1958   D. T. DOWNES ET AL   2,831,791
METHOD AND APPARATUS FOR PROCESSING GLASS
Filed July 29, 1953   6 Sheets-Sheet 6

INVENTORS
DANIEL T. DOWNES and
EDWARD FAUSTIN
BY
Oscar L. Spencer
ATTORNEY

United States Patent Office 2,831,791
Patented Apr. 22, 1958

2,831,791

METHOD AND APPARATUS FOR PROCESSING GLASS

Daniel T. Downes, Wilkinsburg, and Edward Faustin, Brackenridge, Pa., assignors to Pittsburgh Plate Glass Company Application July 29, 1953, Serial No. 371,041

14 Claims. (Cl. 154—2.7)

This invention pertains in general to laminated glass and in particular to apparatus for pressing an assembly of bent glass sheets and an intermediate sheet of thermoplastic material to seal the edges thereof, prior to placing the assembly in the autoclave for completion of the laminating process.

It is well known in the art of manufacturing laminated glass that after the two sheets of glass and an intermediate sheet of thermoplastic material are assembled some means must be provided for elimination of air trapped between the glass sheets. Apparatus previously used may be likened to an old fashion wringer which pressed the plates together while passing the assembly through the rotating wringer rolls. Such apparatus however was usable only with flat glass sheets or sheets having very shallow longitudinal bends.

The one-piece automobile windshields now being installed are examples of laminated bent glass which requires apparatus of an entirely different design for effectively eliminating the trapped air and for sealing the sheets together prior to placing the assembly in an autoclave. Such bent glass sheets not only have sharp, deep bends at the ends when measured longitudinally of the sheet but also have a pronounced curve transversely of the sheet both at the center where the longitudinal curve is relatively flat and at the ends. In many cases such windshields have substantially conical bends at the ends thereof which greatly increases the difficulty of providing pressing rolls which can follow the contour of the glass during the pressing operation.

One object of the present invention is to provide a preliminary pressing apparatus with a pair of pressing rolls which will follow the contour of a bent glass assembly of the character described, which rolls are controlled by the weight of the glass assembly in the necessary vertical and tipping movements of the rolls to accomplish their intended purposes.

Another object of the invention is to provide a pressing apparatus of the character described having a pair of pressing rolls which will follow the contour of the glass sheet passing between the rolls and effectively squeeze out all air trapped between the sheets without breaking the glass.

Another object of the invention is to provide a pressing apparatus of the character described with a pair of rotating rolls which will seal the edges of the assembly of bent glass and thermoplastic material so as to effectively exclude heated fluids used in the autoclave during the completion of the laminating process.

Another object of the invention is to provide a pressing apparatus of the character described with a pair of flexible pressing rolls which, during rotation to draw the bent glass assembly between the rolls, are capable of revolving, twisting, tipping, deflecting, and moving vertically to conform to the contour of the bent glass assembly.

Another object of the invention is to provide a pressing apparatus of the character described in which the weight of the pressing roll assembly is suitably counterbalanced so that all movements of the pressing rolls, other than one of rotation about fixed axes, are actuated and controlled by the weight and shape of the assembled glass sheets being pressed.

A further object of the invention is to provide a pressing apparatus of the character described with suitable conveyors for feeding the glass assembly into the rolls and for receiving the assembly after passing through the rolls.

The exact details of construction of the hereinafter described apparatus may take many forms depending upon the preferences of the individual designer of any particular machine in adapting the apparatus to some specific purpose. The apparatus hereinafter described includes all essential details of construction to disclose the principles of design and operation of the apparatus. The specific details of construction are for purposes of illustration and not limitation.

It is well known in the art to heat the assembly of glass sheets and thermoplastic interlayer in order to effect some sealing of the edges to prevent entrance of the fluids used in the autoclave. The heating ovens and conveying apparatus shown for passing the assembled glass sheets through the ovens and between the pressing apparatuses are therefore of conventional form.

In the drawings forming part of the specification.

Referring now in detail to the drawings, the main frame of the apparatus comprises upright corner framing members 1 connected at each side of the frame by top transverse members 2. The mid portion of the members 2 being connected by a member 3. Within the main frame and suspended from member 3 is an inner frame comprising vertically disposed corner members 4, the upper ends of which members are connected by the members 5 extending transversely of the frame and the members 6 extending longitudinally of the frame. The bottom ends of the members 4 are connected by the corresponding members 5A and 6A. Intermediate the ends of the members 6 is a connecting member 7. This inner frame is suspended from the main frame member 3 by means of the hanger member 8. The upper end of the hanger member 8 is pivotally connected to the under side of the main frame member 3 by means of the anti-friction bearing bracket member 9 and bolts 10. The lower end of the hanger member 8 is connected to the inner frame member 7 between the spaced arms of the bracket member 11 by means of the trunnion member 12. The bracket member 11 is secured to the beam 7 by means of the bolts 13. The trunnion member 12 and the hanger 8 are rotatably connected by means of a spherical roller bearing member 14 mounted in the hanger member 8.

Figure 3:
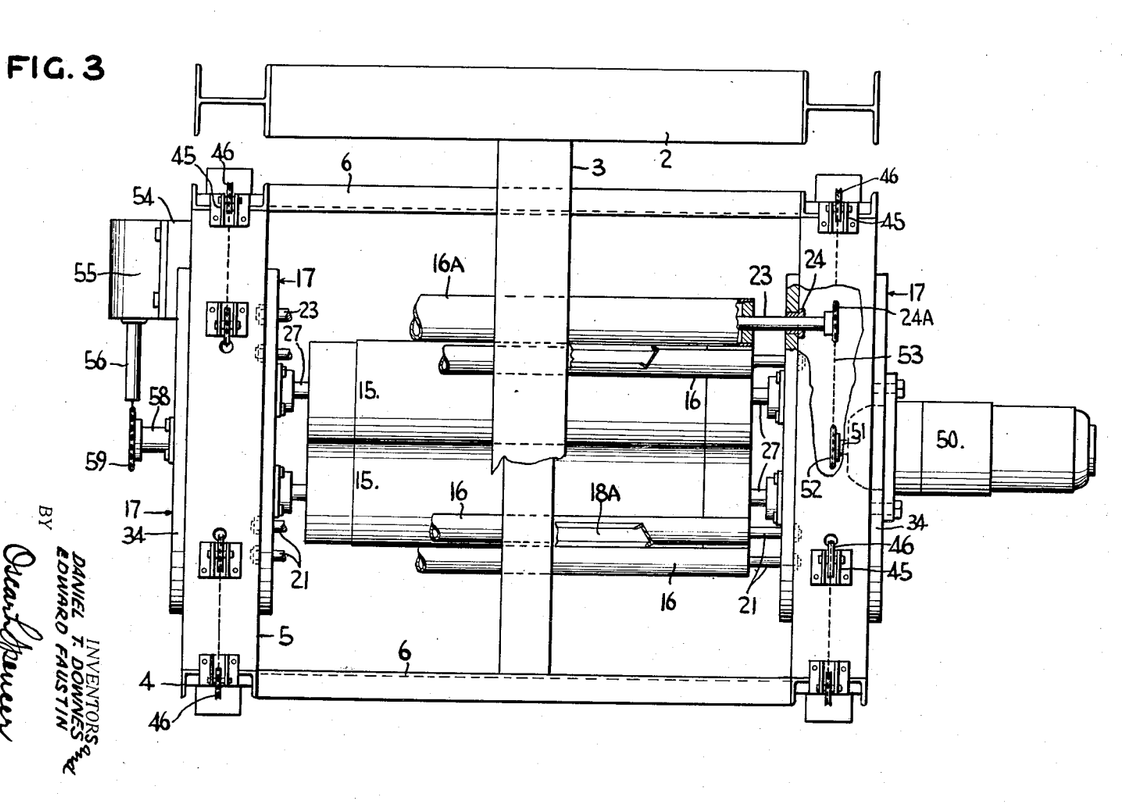
Fig. 3 is a plan view of the apparatus, partly in section.
Figure 4:
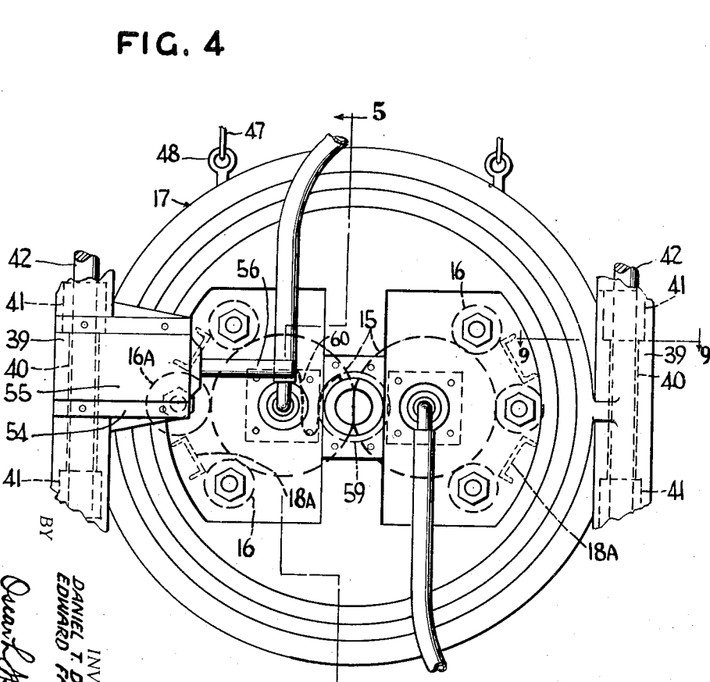
Fig. 4 is an enlarged end elevation of the pressing roll assembly.

The pressing roll assembly comprises contacting flexible rolls 15 and back-up rolls 16 and 16A. This roll assembly is mounted on the spaced housing members 17. Each member 17 comprises a web portion 18 and flange portions 19. The web portions 18 of the members 17 are connected by the spacing members 18A to provide a rigid assembly. Each back-up roll 16 has an aperture in each end thereto to receive the roller bearing 20. A shaft 21 is mounted within the roller bearings 20 of each back-up roll 16 and in turn is secured on the member 17 by any suitable means such as the nuts 22. The back-up roll 16A is rigidly mounted on a shaft 23, and the opposite ends thereof are journaled on the members 17 by means of suitable bearings 24. One end of the shaft 23 extends beyond the bearing 24 and upon this extension is keyed a suitable sprocket 24A. The flexible rolls 15 are journaled on the members 17 for rotation relative thereto and bodily movement therewith as hereinafter described. As shown in Fig. 3 of the drawings the driving back-up roll 16A in engagement with one roll 15 rotates that roll and the second roll 15 is rotated by engagement with the first roll 15. The back-up rolls 16 and 16A being in engagement with the rolls 15 support the latter in their rotary movement.

The precise construction of the pressing rolls 15 may take various forms. The function of these rolls is to feed the laminate assembly through the rolls and at the same time provide full bearing of the rolls on the assembly across the transverse width thereof. In accomplishing this function the rolls 15 preferably must deflect so as to provide greater than line contact between the rolls and the adjacent faces of the glass assembly. The preferred method of obtaining this greater contact is to mount the rolls in a manner such that the spacing between the longitudinal axis of the rolls is less than one half the sum of the diameters of the rolls. Since the rolls are of a pressurized flexible construction, the portions of the peripheries of the rolls in contact with each other will flatten to provide a substantial area of contact and when the glass assembly is passed between the rolls, the flattened area is increased. Due to the flexible nature of the roll construction, if the rolls were merely mounted as just described and without back-up rolls little or no pressure would be exerted on the glass. However by using the back-up rolls 16 and 16A, as indicated, the deflection of rolls 15 occur mainly at the meeting area of the rolls and such deflection is against the resistance of the air pressure within the rolls 15. The optimum air pressure referred to is about 30 pounds p. s. i. but this is subject to variation depending upon the curvature of the plates being pressed.

Figure 5:
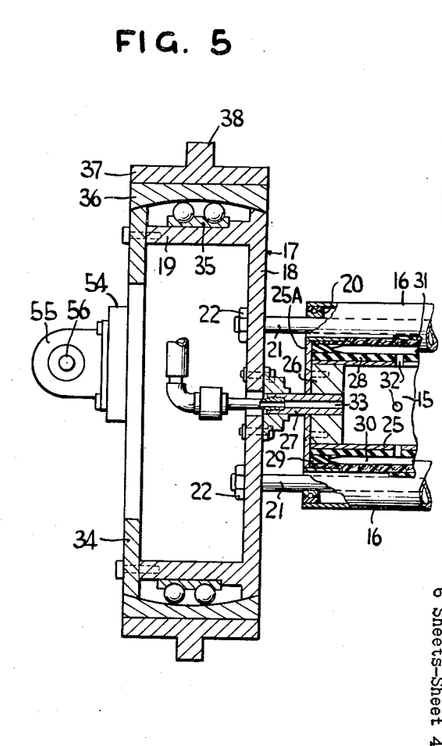
Fig. 5 is a cross section of the pressing roll assembly taken on lines 5—5 of Fig. 4.

As shown in Fig. 5 of the drawings, one suitable form of roll 15 comprises a metal tubing core 25 of suitable length. Each end of the tubing is closed by a suitable plug member 26 having extending therefrom, and beyond the ends of the tubing, a suitable trunnion member 27. The end plugs 26 are rigidly fastened within the tubing 25. The periphery of the tubing 25 is covered throughout its length with a suitable layer of rubber 28. Rubber spacing rings 29 may then be disposed upon the rubber covered tubing at each end thereof. An outer roll covering may then be disposed about the tubing 25 upon the spacing rings 29. Such covering may comprise a flexible rubber facing 31 having a suitable backing comprised of wrappings of tire friction. The backing extends the full length of tube 25 and the rubber facing 31 is of less length. End caps 25A, as shown, enclose the ends of rolls 15 and are secured to the end plugs 26. In this way a suitable air space 30 is provided. Suitable air pressure can be applied to the air space by forming apertures 32 in each end of the tubing and providing an air inlet aperture 33 in the roll trunnion 27.

The roll housing members 17 are each provided with a front closure plate 34 suitably attached to the flanges 19 by machine screws. Mounted on the outer faces of the flanges 19 of the members 17 are spherical bearing inner races 35. The outer race 36 encloses the member 17 and closure plate 34. Enclosing the outer bearing race is a circular casing 37 having a reinforcing rib 38. Mounted on the casing 37 and preferably integral therewith are the guide sleeve members 39. These members 39 have apertures 40 therethrough. The ends of apertures 40 are counterbored to receive ball bushings 41. Disposed within the ball bushings 41, are the steel guide rods 42 upon which the roll assembly moves vertically as hereinafter described. These guide rods 42 are connected to the inner frame members 4 by suitable brackets such as 43. Flexible dust guards 44 are preferably disposed upon the guide rods 42, between the ends of the sleeve members 40 and the bracket members 43, to prevent dirt from accumulating upon the guide rods and interfering with the free movement of the pressing roll assembly sleeves upon the rods 42. The weight of the pressing roll assembly is carried from the inner frame members 5 by means of suitable brackets 45 and pulleys 46 through which are threaded flexible cables 47. Each cable 47 has one end attached to the pressing roll assembly member 37 by the eye-bolt 48 and the opposite end connected to a suitable counterweight 49. The counterweights 49 are so constructed that the pressing roll assembly and the housing member 17 can be moved up and down upon the rods 42 by a small force such as would be supplied by the weight of the laminated assembly being operated upon by the pressing rolls.

At one side of the inner frame and mounted upon the closure plate 34 of the housing member 17 is a motor 50. This motor, which is preferably a variable speed motor, has mounted upon the motor shaft 51 thereof, a suitable chain sprocket 52. A chain 53 connects the motor chain sprocket 52 with the chain sprocket 24A of the back-up roll 16A. By reason of the motor being mounted upon one of the housing members 17, the motor and the roll assembly move as a unit.

At the opposite side of the inner frame and preferably on the sleeve member 39 is mounted a suitable bracket 54 for receiving an air cylinder 55 having a movable piston and rod 56. Mounted upon the adjacent member 17 closure plate 34, by means of a suitable bracket such as 57, is a shaft 58 having a chain sprocket 59 keyed thereto. Connecting the end of the cylinder piston rod 56 and the sprocket 59 is a chain 60 of suitable length. As will be observed from comparison of Figs. 6 and 8, the pressing roll assembly is free to rotate upon the outer bearing race 36 of the housing 17. Such rotation of the assembly also rotates the chain sprocket 59 to wind up the chain 60 attached to the cylinder piston 56. When it is desired to return the pressing roll assembly to initial poistion such as shown in Fig. 6, from its final operating position such as shown in Fig. 8, the cylinder 55 is suitably actuated to retract its piston 56 and pull upon chain 60 to rotate the pressing roll assembly to initial position.

Figure 1:
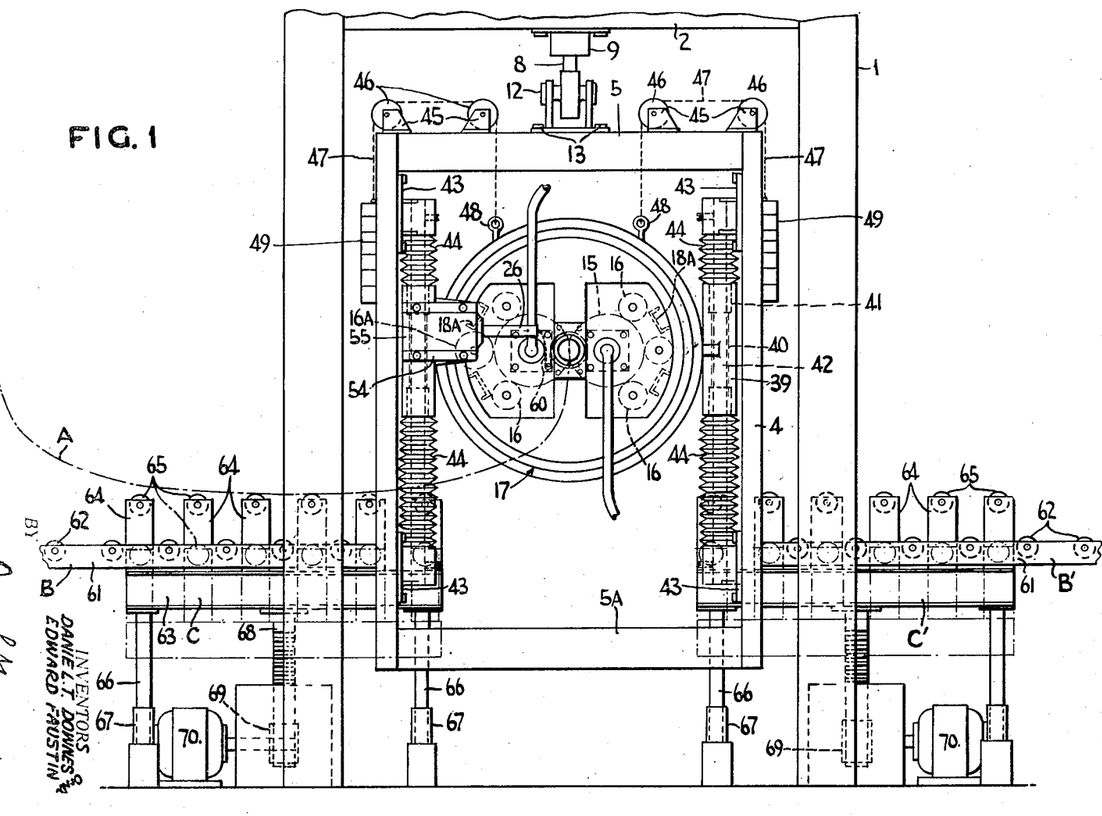
Fig. 1 shows a side elevation of the assembled apparatus.
Figure 10:
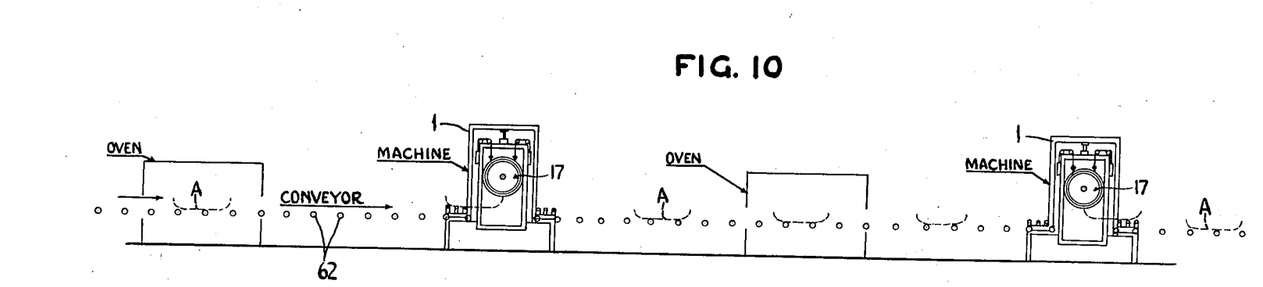
Fig. 10 is a conventional disclosure of a suggested arrangement of heating furnaces and pressing apparatus to effectively complete the pressing of the bent glass assembly before placing into an autoclave.
Figure 11:
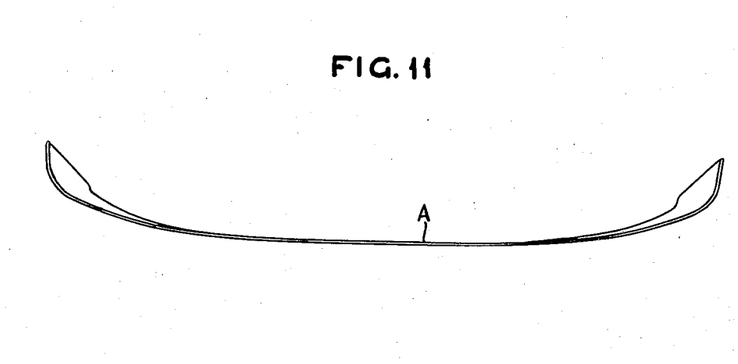
Fig. 11 is a perspective view of a bent glass assembly illustrating one type of conical end portions.

As shown in Figs. 1 and 10 of the drawings, the bent glass assembly A is conveyed towards the pressing roll assembly by means of a conveyor B comprised of the side members 61 and driven rollers 62. Associated with this conveyor is a second conveyor C comprised of side members 63 having upright roll supporting members 64 attached thereto and extending upwardly therefrom between the rollers 62 of the first named conveyor. Journaled on the members 64 are suitable non-driven conveyor rollers 65. Conveyor assembly C is suitably mounted upon the rods 66 attached at one end to the member 63 and at the other end moving within a sleeve member 67. The whole assembly of conveyor C is capable of being raised and lowered upon the rods 66 by any suitable means such as rack member 68 engaged by a suitable pinion member 69 mounted upon a motor 70. This motor 70 is reversable so as to raise and lower the conveyor assembly C as desired. For the purposes of carrying the bent glass assembly A away from the pressing roll assembly similar conveyors B' and C' are provided.

At the beginning of the operation of the preliminary pressing mechanism the conveyors C and C' are in retracted position as shown in dot and dash lines of Fig. 1 of the drawings. The glass assembly A is heated in an oven to a suitable temperature and then passes out of the oven upon the conveyor B. The assembly A advances along the conveyor B until the leading edge of the assembly A is substantially in line vertically with the meeting edges of the rolls 15. In this position the conveyor C, actuated by the motor 70, rises until its rollers 65 engage the glass assembly A lifting it to the conveyor position shown in full lines on Fig. 1 of the drawings. As previously set forth, the rolls of the conveyor B are driven whereas the rolls of conveyor C are not. Hence, any movement of the glass assembly A upon the rollers 65 of the conveyor C is as a result of the assembly A being drawn through the pressing rolls 15.

Figure 6:
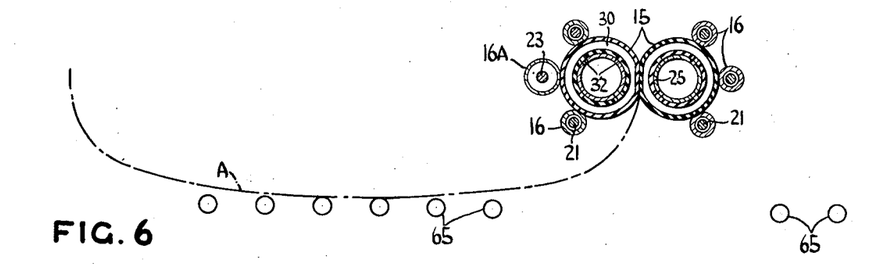
Figs. 6, 7 and 8 are diagrammatic views showing the relative positions of the pressing rolls and the bent glass assembly as it enters, moves through and leaves the pressing rolls.
Figures 7, 8:
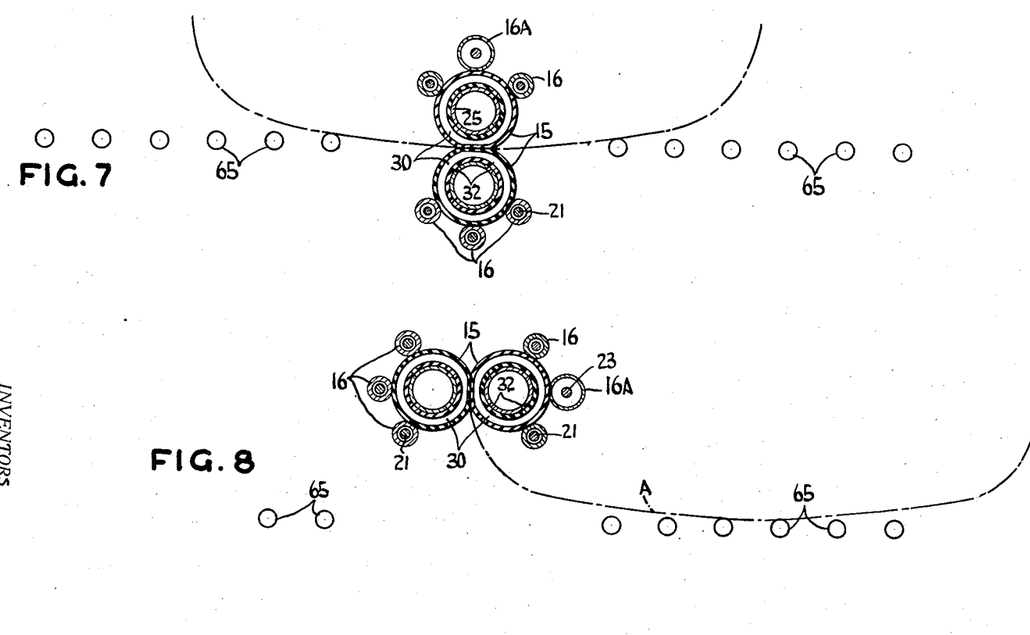
Figure 9:
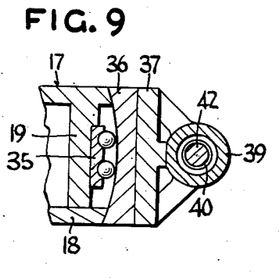
Fig. 9 is a section on lines 9—9 of Fig. 4.

With the glass assembly A in the position shown in Figs. 1 and 6 of the drawings and the rollers 15 actuated by the motor 50 and the driving back-up roll 16A, the leading edge of the glass assembly A is drawn between the rollers 15. Due to the balancing of the pressing roll assembly as hereinbefore described the rolls 15, instead of lifting the glass assembly A from the conveyor rollers 65, are drawn downwardly by the weight of the glass and the entire pressing roll assembly rotates in a clockwise direction to advance along the length of the glass assembly A into the position shown in Fig. 7 of the drawings. In this latter figure it will be noted that the glass assembly A has advanced through the mechanism so that the leading edge of the assembly has passed into engagement with the conveyor rollers of conveyor C' which was raised to position concurrently with conveyor C. Likewise in the position, shown by Fig. 7 of the drawings, the pressing assembly rolls have now rotated approximately 90°. As the pressing rolls 15 continue to draw the glass assembly A therebetween, the pressing roll assembly continues rotating in a clockwise direction until the rolls and the assembly A arrive at the position shown by Fig. 8 of the drawings. Here the glass assembly moves out from between the pressing rolls 15 and is supported entirely upon the conveyor section C'. At this point the mechanism actuating conveyors C and C' moves to lower the conveyor until the glass assembly A again rests upon the driven conveyor rolls 62 of the conveyor B' and from there advances into the next heating oven.

Figure 2:
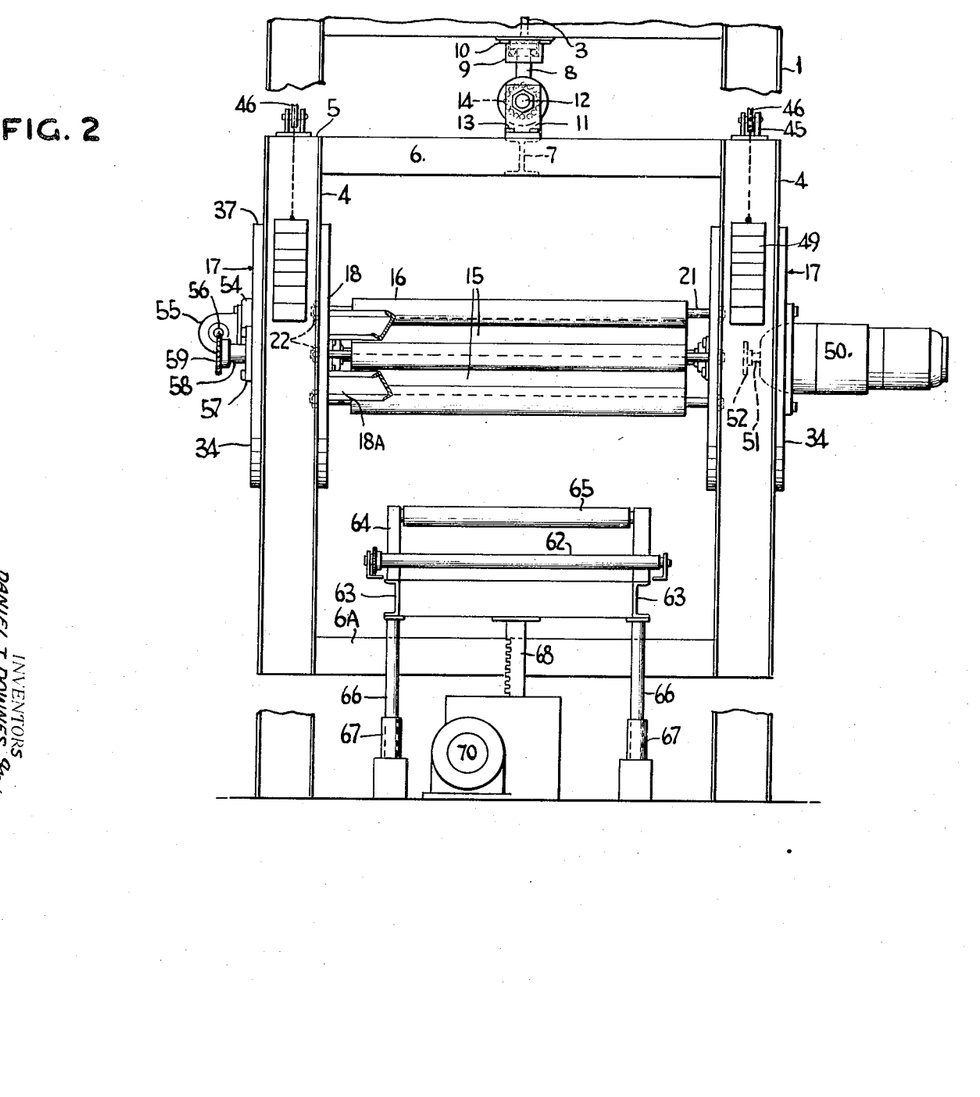
Fig. 2 shows a front view of the apparatus which is part in section and part in elevation.

During rotation of the pressing roll assembly from the position shown in Fig. 6 of the drawings to that shown in Fig. 8, the sprocket 59 of pressing roll assembly, as shown in Figs. 1 and 2 of the drawings, has taken up the slack in the chain 50. To return the pressing roll assembly from the position shown in Fig. 8 of the drawings to initial position, the piston 56 of the cylinder 55 is retracted and pulls upon the chain 60 to rotate the pressing assembly in a counter clockwise direction. This latter movement of the pressing roll assembly places it in the position shown in Fig. 1 of the drawings ready to receive another assembly A.

In the foregoing discussion of the operation of the pressing roll assembly it was assumed that any transverse curvature of the glass assembly would be compensated for by suitable deflection of the flexible rolls 15 so as to provide substantially full bearing of the rolls upon the transverse width of the glass assembly. In many instances however the end bends on the assembly approximate a conical shape, in which case it is not only necessary for the pressing roll assembly to rotate about a horizontal axis, as described, but to also tip or twist in the direction of the length of the rolls and possibly have a slight movement of translation in the direction transversely of the width of the assembly passing between the rolls.

Referring now to Fig. 1 of the drawings, it will be apparent that the entire inner frame and pressing roll assembly can move as a unit upon the hanger 8 and roller bearings 14 in a direction transversely of the conveyors B and C'. Likewise the pressing roll assembly can at the same time rotate upon the spherical bearing races 35 and 36 to provide rotary movement in a direction substantially vertical to the plane of rotation of the rolls 15. This combination of turning, twisting and tilting of the rolls will permit the pressing roll assembly to assume the necessary positions relative to the glass assembly A, passing through the rolls, so as to avoid breaking of the substantially conical ends of the glass and at the same time maintain a substantially uniform pressure in a direction transversely of the sheets forming the glass assembly. The flexibility of the rolls 15 to conform to the contour of the glass passing between them also assists in maintaining this uniform pressure.

The details of construction of the apparatus hereindisclosed are for purposes of illustration only and are not to be considered as limitations except as made necessary by the scope of the appended claims. The apparatus is designed so as to require a minimum of force to move the several portions thereof in the manner hereindisclosed. Experimentation has proved that this minimum force is supplied by the rigidity of the glass and the forces of gravity acting upon the glass assembly passing through the pressurized rolls 15. Certain modifications or additions to the apparatus as a whole will readily suggest themselves to those skilled in the art, such as photoelectric cells or other electrical devices for actuating the motors and suitable devices for overcoming frictional resistances in the mechanism. Such modifications or additions will not change the basic combination of elements hereindisclosed and claimed.

We claim:

1. In the method of prepressing curved glass plastic assemblies having a central portion curved about parallel axes of generation and extreme portions curved about axes oriented differently from the parallel axes, said assemblies having an interlayer of thermoplastic material, said method comprising preheating the assembly, the improvement comprising conveying the assembly past a prepressing station along a substantially unidirectional path, simultaneously applying a line of pressure on opposite surfaces of the assembly in a plane cutting across the path of movement of the assembly, said line of pressure extending completely across the assembly, and tilting the line of pressure in said plane to coincide with deviations of the curvature of the assembly relative to the axis of movement as different increments of the assembly pass the prepressing station.

2. In the method recited in claim 1, wherein the direction of the substantially unidirectional path is horizontal.

3. In the method of prepressing a curved glass plastic assembly having a leading edge biased with respect to the plane tangential to its central portion, said assembly having an interlayer of thermoplastic material, said method comprising preheating the assembly, the improvement comprising conveying the assembly past a prepressing station along a substantially unidirectional path substantially parallel to the plane defined by the central portion of the assembly, simultaneously applying a line of pressure on opposite surfaces of the assembly in a plane cutting across the path of movement of the assembly, said line of pressure extending completely across the assembly, tilting the line of pressure application in said plane and rotating the line about an axis normal to said path to coincide with deviations of the curvature of the assembly relative to the axis of movement as different increments of the assembly pass the prepressing station.

4. Apparatus for pressing bent glass sheet assemblies prior to laminating comprising a supporting structure, a roll assembly mounted to the supporting structure for movement relative thereto and including two rotating opposing pressing rolls journaled on a housing on each end of the rolls, a support for each housing, a spherical ball bearing mounted on each support and rotatably mounting each housing to said supports and enclosing each housing on which the rolls are journaled, guide rods on the supporting structure, sleeves mounted on said supports and slidably engaging said guide rods to provide separate vertical movement of said supports, and a counterweight connected to each support for balancing the pressing roll assembly for movement upon the guide rods due to weight of the bent glass assembly passing between the rolls.

5. Apparatus for pressing bent glass sheet assemblies prior to laminating comprising a supporting structure, a roll assembly mounted to the supporting structure for movement relative thereto and including two rotating opposing pressing rolls journaled on a housing on each end of the rolls, a support for each housing, and a spherical bearing mounted on each support and rotatably mounting each housing to said supports, said supports being mounted to said supporting structure to provide separate vertical movement of said supports.

6. Apparatus for pressing bent glass sheet assemblies prior to laminating comprising a supporting structure, an inner frame mounted to the supporting structure for rotation about a vertical axis, and a roll assembly mounted to the inner frame and including two rotating opposing pressing rolls journaled on a housing at each end of the rolls to provide rotation of said rolls about their axes.

7. Apparatus for preliminary pressing of heated glass assemblies, including a thermoplastic interlayer, comprising a supporting frame, driven conveyors for said glass assemblies leading to and away from the supporting frame, an inner frame suspended within the supporting frame for pivotal movement relative thereto, a pressing roll assembly including two opposing rotatable flexible pressing rolls having fixed axes of rotation, a spherical anti-friction bearing support for each end of the pressing roll assembly, means on said inner frame associated with each said support permitting separate vertical movement of each end of the pressing roll assembly relative to the inner frame, means on the pressing roll assembly and movable therewith for rotating the pressing rolls, a counterweight on the inner frame at each end of the pressing roll assembly for counterbalancing at each end the weight of the assembly upon its support providing vertical movement relative to the inner frame, said counterweight at each end normally holding the pressing roll assembly above the path of movement of a bent glass assembly upon the driven conveyors leading to and away from the main frame, subconveyors associated with each driven conveyor for selectively supporting the glass assemblies above the driven conveyors, and means for actuating the subconveyors for carrying the glass assemblies into position above the driven conveyor for engagement with the pressing rolls and returning the glass assemblies to the driven conveyor after the pressing rolls pass out of engagement with the glass assemblies.

8. Apparatus for pressing bent glass sheet assemblies prior to laminating comprising a supporting structure, an inner frame suspended from the structure for movement relative thereto, a roll assembly including two rotating opposing pressing rolls journaled on a housing at each end of the rolls, a support for each housing, a spherical ball bearing mounted on each support and enclosing each housing on which the rolls are journaled, guide rods on the inner frame, a sleeve on each support for cooperating with the guide rods to permit separate vertical movement of each end of the roll assembly relative to the guide rods, and a counterweight connected to each support for balancing the pressing roll assembly for movement upon the guide rods due to weight of the bent glass assembly passing between the rolls.

9. Apparatus for pressing bent glass assemblies, comprising a supporting structure, a pair of spaced housings, a pair of pressing rolls journaled for rotary movement only upon said spaced housings, and each housing being journaled in a spherical bearing support, each support mounted for separate vertical movement of each housing relative to the supporting structure and said housings being mounted to the bearing supports for rotation about an axis parallel to the axes of rotation of said rolls.

10. In a preliminary pressing apparatus, in combination with a supporting frame, an inner frame suspended from the supporting frame for relative movement about a vertical axis, a pair of pressing rolls disposed within said inner frame, a support for each end of the pair of pressing rolls rotatably mounted thereto, spaced guide rods on the inner frame, a spherical bearing supporting member for each support for the pressing rolls, each bearing supporting member providing for rotation of the supports, and means for mounting said bearing supporting members on the inner frame guide rods for separate vertical movement of said bearing supporting members.

11. Apparatus for preliminary pressing of bent glass assemblies including a thermoplastic interlayer, comprising a pair of opposing flexible rolls rotatable about fixed axes, a supporting member at each end of the rolls and upon which the rolls are journaled for rotation, an outer supporting frame, an inner frame suspended therefrom for relative movement about a vertical axis, guide members on the inner frame, a pair of spaced spherical bearing supports mounted on said guide members for separate vertical movement, each roll supporting member being rotatably mounted on one of said spherical bearings supports, and means connected with each spherical bearing support and the inner frame for counterbalancing the weight of the pressing rolls so that movement of the rolls and their supports upon the inner frame guide members results from the weight of the glass assembly passing through the rolls.

12. In apparatus for preliminary pressing of heated glass assemblies comprising two matched sheets of curved glass each having at least one extremity canted with respect to the rest of the sheet and a thermoplastic interlayer therebetween, said apparatus including means for heating the glass assembly and means for conveying the assembly, a prepressing station comprising a supporting structure, a roll housing, a pair of flexible, inflatable, rotatable rolls opposing each other within said housing, means for introducing one end of the glass assembly between said flexible rolls, means for revolving the rolls about each other as the flexible rolls rotate individually in frictional contact against opposite surfaces of the glass assembly to cause the latter to move therethrough, means for mounting the housing to the supporting structure to provide for rotation of the housing about an axis parallel to the axes of rotation of said rolls and rotation of the housing about a vertical axis, and said mounting means including spherical bearing means supporting the housing and enabling the latter to be tilted transversely of the direction of movement of the glass through the prepressing station in response to the deviations in curvature as different increments of the assembly pass between the prepressing rolls.

13. In apparatus for pressing bent glass assemblies prior to lamination, in combination, a supporting structure, a pressing roll assembly suspended within the structure for vertical movement relative thereto, said assembly including a pair of pressing rolls mounted for rotation about their axes and for movement of the pair about an axis therebetween, conveyors for said glass assemblies leading to and away from the structure in a direction transverse to the axis of the pressing roll assembly, vertically movable bent glass assembly supports associated with each conveyor, and actuated motor means for raising said supports to lift and maintain the glass assemblies above and spaced from the conveyor during engagement of the glass assemblies with the pressing rolls.

14. Apparatus for pressing bent glass sheet assemblies prior to laminating comprising a supporting structure, a roll assembly mounted to the supporting structure and including two rotating opposing pressing rolls journaled on a housing on each end of the rolls to provide rotation of the rolls about their axes, a conveyor for moving said glass assemblies toward said roll assembly in a direction transverse to the axes of the rolls, a vertically movable bent glass assembly support associated with said conveyor, and actuated motor means for raising said support in response to the glass assembly occupying said support, whereby the glass assembly is moved upwardly away from the conveyor into engagement with at least one of the pressing rolls.

References Cited in the file of this patent

UNITED STATES PATENTS

| | | |
|---|---|---|
| 2,075,726 | Kamerer | Mar. 30, 1937 |
| 2,334,651 | Schafer | Nov. 16, 1943 |
| 2,628,177 | Boicey et al. | Feb. 10, 1953 |
| 2,635,973 | Swindler | Apr. 21, 1953 |
| 2,673,168 | Pascoe et al. | Mar. 23, 1954 |

OTHER REFERENCES

Faires: Design of Machine Elements, published by Macmillan, N. Y. C., 1937, Figure 289, page 365; Figure 284, page 357.

Dedication 2,831,791.—*Daniel T. Downes*, Wilkinsburg, and *Edward Faustin*, Brackenridge, Pa. METHOD AND APPARATUS FOR PROCESSING GLASS. Patent dated Apr. 22, 1958. Dedication filed July 25, 1973, by the assignee, *PPG Industries, Inc.*

Hereby dedicates the remainder of its term to the free use and benefit of the People of the United States.

[*Official Gazette December 4, 1973.*]